United States Patent
Choi

(10) Patent No.: US 8,536,300 B2
(45) Date of Patent: Sep. 17, 2013

(54) PHOTOCROSSLINKABLE ELECTRICALLY CONDUCTIVE POLYMERS

(75) Inventor: Dong Hoon Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 583 days.

(21) Appl. No.: 12/650,058

(22) Filed: Dec. 30, 2009

(65) Prior Publication Data
US 2011/0159249 A1    Jun. 30, 2011

(51) Int. Cl.
*C08G 75/00* (2006.01)
*C08G 75/32* (2006.01)
*C07D 495/02* (2006.01)

(52) U.S. Cl.
USPC ............... 528/373; 528/377; 549/50; 549/77

(58) Field of Classification Search
USPC ............................. 528/373, 377; 549/50, 77
See application file for complete search history.

(56) References Cited

U.S. PATENT DOCUMENTS

| | | | |
|---|---|---|---|
| 5,300,575 A | 4/1994 | Jonas et al. | |
| 7,378,039 B2 * | 5/2008 | Louwet et al. | 252/500 |
| 7,605,396 B2 | 10/2009 | Nakamura | |
| 7,659,410 B2 * | 2/2010 | Ohba et al. | 549/77 |
| 2003/0088032 A1 | 5/2003 | Luebben et al. | |
| 2003/0211331 A1 | 11/2003 | Louwet et al. | |
| 2008/0050534 A1 | 2/2008 | Louwet et al. | |
| 2008/0105854 A1 | 5/2008 | Huh et al. | |

FOREIGN PATENT DOCUMENTS

| | | |
|---|---|---|
| JP | 2006219600 A * | 8/2006 |
| KR | 100548045 | 2/2006 |
| KR | 1020090127732 | 12/2009 |
| WO | 02/065484 A1 | 8/2002 |
| WO | 2008/144756 | 11/2008 |

OTHER PUBLICATIONS

K. G. Chittibabu, et al "Synthesis and Properties of a Novel Polythiophene Derivative with a Side-Chane NLO Chromophore" Chem. Mater. 1994, 6, 475-480.
Massimiliano Lanzi, et al "New photosetting NLO—active polythiophenes with enhanced optical stability" European Polymer Journal 45 (2009) 1118-1126.
Kai Wing Cheng, et al "Synthesis of Conjugated Polymers with Pendant Ruthenium Terpyridine Trithiocyanato Complexes and Their Applications in Heterojunction Photovoltaic Cells" Journal of Polymer Science: Part A: Polymer Chemistry, 2008, vol. 46, pp. 1305-1317.
J. Morgado, et al "Optical properties of cross-linkable fluorene copolymers" Proceedings of SPIE—The International Society for Optical Engineering (2006), vol. 6192: (Organic Optoelectronics and Photonics II) pp. 619224/1-619224/7.
Australian Patent Office, International Search Report and Written Opinion mailed Mar. 29, 2011 in corresponding PCT application No. PCT/KR2010/009122.

* cited by examiner

*Primary Examiner* — Amanda C. Walke
(74) *Attorney, Agent, or Firm* — Workman Nydegger

(57) ABSTRACT

Photocrosslinkable electrically conductive polymers and compositions including the polymers are provided. Also, electrically conductive layers or films formed from the compositions, preparation methods of these, and articles including the electrically conductive layers or films are provided. The electrically conductive polymers according to the present disclosure have photoreactive groups that can be crosslinked using like. The electrically conductive polymers can also be dissolved in aqueous solution. These photocrosslinkable and soluble properties allow the electrically conductive polymers to be used in wet processing to make films and/or to be made into a patterned conductive layer or film using a photomask.

4 Claims, 1 Drawing Sheet

PHOTOCROSSLINKABLE ELECTRICALLY CONDUCTIVE POLYMERS

TECHNICAL FIELD

The present disclosure relates generally to techniques for producing photocrosslinkable electrically conductive polymers.

BACKGROUND

Electrical conductivity is a useful property in transparent electrodes, electromagnetic wave shielding films, antistatic agents, solar cells and the like. Currently, electrical conductivity is achieved in transparent films by application of a thin metallic coating such as gold, silver or copper, or a metal oxide coating such as Indium Tin Oxide (ITO). Transparent conductive oxide films such as ITO are used in a wide variety of applications such as, but not limited to, window de-icers, heat reflectors, LCDs, OLEDs, solar cells, and architectural coatings. One feature of ITO coatings is that they tend to have weak mechanical strength and low flexibility, which makes them fragile and readily damaged during bending. In addition, ITO coatings are generally applied using vacuum deposition and are therefore not able to form patterns or circuits through wet processing. Also, the high raw material cost of indium and the chemical stability in some device structures limit potential applications.

SUMMARY

Photocrosslinkable electrically conductive polymers and compositions including the polymers are provided. Also, electrically conductive layers or films formed from the compositions, preparation methods of these, and articles including the electrically conductive layers or films are provided. The electrically conductive polymers according to the present disclosure have photoreactive groups that can be crosslinked. The electrically conductive polymers can also be dissolved in a solvent. These properties allow the electrically conductive polymers to be used in wet processing to make films and/or to be made into a patterned conductive layer or film using a photomask.

According to one aspect, the electrically conductive polymers include two or more repeating units. At least one of the units includes one or more photosensitive groups that can be crosslinked upon exposure to light. In one embodiment, the photocrosslinkable, electrically conductive polymers may include repeating units of formula 1 and formula 2 below.

[Formula 1]

[Formula 2]

In the foregoing formulas, A and B are independently at least one member selected from phenylene, phenylene vinylene, pyrrolylene, pyrrolylene vinylene, thienylene, thienylene vinylene, fluorenylene, fluorenylene vinylene, furanylene, furanylene vinylene, phenothiazinylene, phenothiazinylene vinylene, phenazinylene, phenazinylene vinylene, phenoxazinylene and phenoxazinylene vinylene, which are unsubstituted or substituted with one or more substituents. The substituents may be independently selected from the group hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylhio, alkylthioalkyl, arylthio, arylsulfonyl and arylsulfinyl. Or, the substituents together may form an alkylene or alkenylene chain completing a 3, 4, 5, 6, or 7-membered aromatic or alicyclic ring. The rings may optionally include one or more divalent nitrogen, sulfur or oxygen atoms and the substituents may optionally be further substituted or unsubstituted. In Formulas 2, $R_1$ is Y or L-Y, wherein Y is a photoreactive group and L is a linker; the ratio of the repeating unit of formula 1 and the repeating unit of formula 2 is 1:0.1 to 1:0.3 the copolymer has a degree of polymerization of 100 to 1,000; and the copolymer may optionally be doped with one or more polymeric acids.

According to an aspect described herein, a composition includes a copolymer described herein, such as the illustrative copolymer set forth above. According to another aspect, an electrically conductive layer can be formed from a composition disclosed herein, such as the illustrative composition set forth above. In another aspect, an electrically conductive film can be formed from a composition disclosed herein, such as the illustrative composition set forth above.

According to other aspects described herein, a process for preparing an electrically conductive layer or film includes applying to a substrate a composition disclosed herein, such as the composition set forth above. According to other aspects, an article includes at least one electrically conductive layer formed from a composition disclosed herein, such as the illustrative composition set forth above The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

I. Introduction

Figure 1:
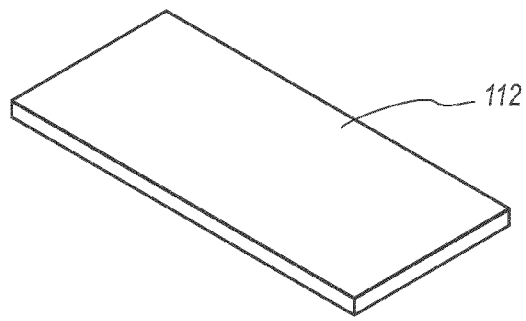
FIG. 1 is a perspective view of a substrate that may be used in an illustrative embodiment of a process for manufacturing an article using an electrically conductive copolymer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The electrically conductive polymers according to the present disclosure have photoreactive groups. Under exposure to light, the photoreactive groups photocrosslink the polymers with each other. Furthermore, the electrically conductive polymers can be dissolved in a solvent. In one embodiment, the solvent can be an aqueous or polar solution such as, but not limited to, water, alcohol, and/or the like. These photocrosslinkable and soluble properties allow the electrically conductive polymers to be easily used in wet processing. That is, when the polymer layer is exposed to light through a photomask, exposed parts of the polymer layer may harden and unexposed parts of the polymer layer may remain in solution. The unexposed portions can then be washed off using a solvent. The remaining hardened polymer film or layer may have a desired pattern provided by the photomask (i.e., the area not occluded by the photomask).

In some embodiments, manufacturing the patterned electrically conductive layers or films can be done without etching, which minimizes the cost of manufacturing the layers or films. Furthermore, two or more adjacent layers can be formed using iterations of this technique because the hardened (i.e., crosslinked) polymer is not soluble in the solutions used to make subsequent layers. Therefore, the electrically conductive polymers including the photoreactive groups can be fabricated in large layers or films, and they can be patterned in predetermined sections using a photomask to prepare patterned conductive layers or films.

The photocrosslinkable electrically conductive polymer in the present disclosure can be prepared by copolymerization of a conventional electrically conductive polymer and an electrically conductive polymer having a photoreactive group.

Unless otherwise indicated, this disclosure uses the definitions provided below. Some of the definitions and formulae may include a dash ("-") to indicate a bond between atoms or a point of attachment to a named or unnamed atom or group of atoms. Other definitions and formulae may include an equal sign ("=") or an identity symbol ("≡") to indicate a double bond or a triple bond, respectively.

"Substituted" groups are those in which one or more hydrogen atoms have been replaced with one or more non-hydrogen groups, provided that valence requirements are met and that a chemically stable compound results from the substitution.

"Alkyl" refers to straight chain and branched saturated hydrocarbon groups, generally having a specified number of carbon atoms (i.e., $C_{1-6}$ alkyl refers to an alkyl group having 1, 2, 3, 4, 5, or 6 carbon atoms and $C_{1-12}$ alkyl refers to an alkyl group having 1, 2, 3, 4, 5, 6, 7, 8, 9, 10, 11, or 12 carbon atoms). Examples of alkyl groups include, without limitation, methyl, ethyl, n-propyl, i-propyl, n-butyl, s-butyl, i-butyl, t-butyl, pent-1-yl, pent-2-yl, pent-3-yl, 3-methylbut-1-yl, 3-methylbut-2-yl, 2-methylbut-2-yl, 2,2,2-trimethyleth-1-yl, n-hexyl, and the like.

"Alkenyl" refers to straight chain and branched hydrocarbon groups having one or more unsaturated carbon-carbon bonds, and generally having a specified number of carbon atoms. Examples of alkenyl groups include, without limitation, ethenyl, 1-propen-1-yl, 1-propen-2-yl, 2-propen-1-yl, 1-buten-1-yl, 1-buten-2-yl, 3-buten-1-yl, 3-buten-2-yl, 2-buten-1-yl, 2-buten-2-yl, 2-methyl-1-propen-1-yl, 2-methyl-2-propen-1-yl, 1,3-butadien-1-yl, 1,3-butadien-2-yl, and the like.

"Alkynyl" refers to straight chain or branched hydrocarbon groups having one or more triple carbon-carbon bonds, and generally having a specified number of carbon atoms.

Examples of alkynyl groups include, without limitation, ethynyl, 1-propyn-1-yl, 2-propyn-1-yl, 1-butyn-1-yl, 3-butyn-1-yl, 3-butyn-2-yl, 2-butyn-1-yl, and the like.

"Alkanoyl" and "alkanoylamino" refer, respectively, to alkyl-C(O)— and alkyl-C(O)—NH—, where alkyl is defined above, and generally includes a specified number of carbon atoms, including the carbonyl carbon. Examples of alkanoyl groups include, without limitation, formyl, acetyl, propionyl, butyryl, pentanoyl, hexanoyl, and the like.

"Alkenoyl" and "alkynoyl" refer, respectively, to alkenyl-C(O)— and alkynyl-C(O)—, where alkenyl and alkynyl are defined above. References to alkenoyl and alkynoyl generally include a specified number of carbon atoms, excluding the carbonyl carbon. Examples of alkenoyl groups include, without limitation, propenoyl, 2-methylpropenoyl, 2-butenoyl, 3-butenoyl, 2-methyl-2-butenoyl, 2-methyl-3-butenoyl, 3-methyl-3-butenoyl, 2-pentenoyl, 3-pentenoyl, 4-pentenoyl, and the like. Examples of alkynoyl groups include, without limitation, propynoyl, 2-butynoyl, 3-butynoyl, 2-pentynoyl, 3-pentynoyl, 4-pentynoyl, and the like.

"Alkoxy," "alkoxycarbonyl," and "alkoxycarbonylamino," refer, respectively, to alkyl-O—, alkenyl-O, and alkynyl-O; to alkyl-O—C(O)—, alkynyl-O—C(O)—; and to alkyl-O—C(O)—NH—, and alkynyl-O—C(O)—NH—, where alkyl, alkenyl, and alkynyl are defined above. Examples of alkoxy groups include, without limitation, methoxy, ethoxy, n-propoxy, i-propoxy, n-butoxy, s-butoxy, t-butoxy, n-pentoxy, s-pentoxy, and the like. Examples of alkoxycarbonyl groups include, without limitation, methoxycarbonyl, ethoxycarbonyl, n-propoxycarbonyl, i-propoxycarbonyl, n-butoxycarbonyl, s-butoxycarbonyl, t-butoxycarbonyl, n-pentoxycarbonyl, s-pentoxycarbonyl, and the like.

"Alkylamino," "alkylaminocarbonyl," "dialkylaminocarbonyl," "alkylsulfonyl," "alkylsulfinyl," "sulfonylaminoalkyl," and "alkylsulfonylaminocarbonyl" refer, respectively, to alkyl-NH—, alkyl-NH—C(O)—, alkyl$_2$-N—C(O)—, alkyl-S(O$_2$)—, alkyl-S(=O)—, HS(O$_2$)—NH-alkyl-, and alkyl-S(O)—NH—C(O)—, where alkyl is defined above.

"Aminoalkyl" and "cyanoalkyl" refer, respectively, to NH$_2$-alkyl and N≡C-alkyl, where alkyl is defined above.

"Halo," "halogen" and "halogeno" may be used interchangeably, and refer to fluoro, chloro, bromo, and iodo.

"Haloalkyl," "haloalkenyl," "haloalkynyl," "haloalkanoyl," "haloalkenoyl," "haloalkynoyl," "haloalkoxy," and "haloalkoxycarbonyl" refer, respectively, to alkyl, alkenyl, alkynyl, alkanoyl, alkenoyl, alkynoyl, alkoxy, and alkoxycarbonyl groups substituted with one or more halogen atoms, where alkyl, alkenyl, alkynyl, alkanoyl, alkenoyl, alkynoyl, alkoxy, and alkoxycarbonyl are defined above. Examples of haloalkyl groups include, without limitation, trifluoromethyl, trichloromethyl, pentafluoroethyl, pentachloroethyl, and the like.

"Hydroxyalkyl" and "oxoalkyl" refer, respectively, to HO-alkyl and O=alkyl, where alkyl is defined above. Examples of hydroxyalkyl and oxoalkyl groups include, without limitation, hydroxymethyl, hydroxyethyl, 3-hydroxypropyl, oxomethyl, oxoethyl, 3-oxopropyl, and the like.

"Cycloalkyl" refers to saturated monocyclic and bicyclic hydrocarbon rings, generally having a specified number of carbon atoms that comprise the ring (i.e., C3-7 cycloalkyl refers to a cycloalkyl group having 3, 4, 5, 6 or 7 carbon atoms as ring members). The cycloalkyl may be attached to a parent group or to a substituent at any ring atom, unless such attachment would violate valence requirements. Likewise, the cycloalkyl groups may include one or more non-hydrogen substituents unless such substitution would violate valence requirements.

Examples of monocyclic cycloalkyl groups include, without limitation, cyclopropyl, cyclobutyl, cyclopentyl, cyclohexyl, and the like. Examples of bicyclic cycloalkyl groups include, without limitation, bicyclo[1.1.0]butyl, bicyclo[1.1.1]pentyl, bicyclo[2.1.0]pentyl, bicyclo[2.1.1]hexyl, bicyclo[3.1.0]hexyl, bicyclo[2.2.1]heptyl, bicyclo[3.2.0]heptyl, bicyclo[3.1.1]heptyl, bicyclo[4.1.0]heptyl, bicyclo[2.2.2]octyl, bicyclo[3.2.1]octyl, bicyclo[4.1.1]octyl, bicyclo[3.3.0]octyl, bicyclo[4.2.0]octyl, bicyclo[3.3.1]nonyl, bicyclo[4.2.1]nonyl, bicyclo[4.3.0]nonyl, bicyclo[3.3.2]decyl, bicyclo[4.2.2]decyl, bicyclo[4.3.1]decyl, bicyclo[4.4.0]decyl, bicyclo[3.3.3]undecyl, bicyclo[4.3.2]undecyl, bicyclo[4.3.3]dodecyl, and the like, which may be attached to a parent group or a substituent at any of the ring atoms, unless such attachment would violate valence requirements.

"Cycloalkenyl" refers to monocyclic and bicyclic hydrocarbon rings having one or more unsaturated carbon-carbon bonds and generally having a specified number of carbon atoms that comprise the ring (i.e., C3-7 cycloalkenyl refers to a cycloalkenyl group having 3, 4, 5, 6 or 7 carbon atoms as ring members). The cycloalkenyl may be attached to a parent group or to a substituent at any ring atom, unless such attachment would violate valence requirements.

Likewise, the cycloalkenyl groups may include one or more non-hydrogen substituents unless such substitution would violate valence requirements. Useful substituents include, without limitation, alkyl, alkenyl, alkynyl, haloalkyl, haloalkenyl, haloalkynyl, alkoxy, alkoxycarbonyl, alkanoyl, and halo, as defined above, and hydroxy, mercapto, nitro, and amino.

"Cycloalkanoyl" and "cycloalkenoyl" refer to cycloalkyl-C(O)— and cycloalkenyl-C(O)—, respectively, where cycloalkyl and cycloalkenyl are defined above. References to cycloalkanoyl and cycloalkenoyl generally include a specified number of carbon atoms, excluding the carbonyl carbon. Examples of cycloalkanoyl groups include, without limitation, cyclopropanoyl, cyclobutanoyl, cyclopentanoyl, cyclohexanoyl, cycloheptanoyl, 1-cyclobutenoyl, 2-cyclobutenoyl, 1-cyclopentenoyl, 2-cyclopentenoyl, 3-cyclopentenoyl, 1-cyclohexenoyl, 2-cyclohexenoyl, 3-cyclohexenoyl, and the like.

"Cycloalkoxy" and "cycloalkoxycarbonyl" refer, respectively, to cycloalkyl-O— and cycloalkenyl-O, and to cycloalkyl-O—C(O)— and cycloalkenyl-O—C(O)—, where cycloalkyl and cycloalkenyl are defined above. References to cycloalkoxy and cycloalkoxycarbonyl generally include a specified number of carbon atoms, excluding the carbonyl carbon.

Examples of cycloalkoxy groups include, without limitation, cyclopropoxy, cyclobutoxy, cyclopentoxy, cyclohexoxy, 1-cyclobutenoxy, 2-cyclobutenoxy, 1-cyclopentenoxy, 2-cyclopentenoxy, 3-cyclopentenoxy, 1-cyclohexenoxy, 2-cyclohexenoxy, 3-cyclohexenoxy, and the like. Examples of cycloalkoxycarbonyl groups include, without limitation, cyclopropoxycarbonyl, cyclobutoxycarbonyl, cyclopentoxycarbonyl, cyclohexoxycarbonyl, 1-cyclobutenoxycarbonyl, 2-cyclobutenoxycarbonyl, 1-cyclopentenoxycarbonyl, 2-cyclopentenoxycarbonyl, 3-cyclopentenoxycarbonyl, 1-cyclohexenoxycarbonyl, 2-cyclohexenoxycarbonyl, 3-cyclohexenoxycarbonyl, and the like.

"Aryl" and "arylene" refer to monovalent and divalent aromatic groups, respectively, including 5- and 6-membered monocyclic aromatic groups that contain 0 to 4 heteroatoms independently selected from nitrogen, oxygen, and sulfur. Examples of monocyclic aryl groups include, without limitation, phenyl, pyrrolyl, furanyl, thiophenyl, thiazolyl, isothiazolyl, imidazolyl, triazolyl, tetrazolyl, pyrazolyl, oxazolyl, isooxazolyl, pyridinyl, pyrazinyl, pyridazinyl, pyrimidinyl, and the like. Aryl and arylene groups also include bicyclic groups, tricyclic groups, etc., including fused 5- and 6-membered rings as described above. Examples of multicyclic aryl groups include, without limitation, naphthyl, biphenyl, anthracenyl, pyrenyl, carbazolyl, benzoxazolyl, benzodioxazolyl, benzothiazolyl, benzoimidazolyl, benzothiophenyl, quinolinyl, isoquinolinyl, indolyl, benzofuranyl, purinyl, indolizinyl, and the like. The aryl and arylene groups may be attached to a parent group or to a substituent at any ring atom, unless such attachment would violate valence requirements.

Likewise, aryl and arylene groups may include one or more non-hydrogen substituents unless such substitution would violate valence requirements. Useful substituents include, without limitation, alkyl, alkenyl, alkynyl, haloalkyl, haloalkenyl, haloalkynyl, cycloalkyl, cycloalkenyl, alkoxy, cycloalkoxy, alkanoyl, cycloalkanoyl, cycloalkenoyl, alkoxycarbonyl, cycloalkoxycarbonyl, and halo, as defined above, and hydroxy, mercapto, nitro, amino, and alkylamino.

"Heterocycle" and "heterocyclyl" refer to saturated, partially unsaturated, or unsaturated monocyclic or bicyclic rings having from 5 to 7 or from 7 to 11 ring members, respectively. These groups have ring members made up of carbon atoms and from 1 to 4 heteroatoms that are independently nitrogen, oxygen or sulfur, and may include any bicyclic group in which any of the above-defined monocyclic heterocycles are fused to a benzene ring. The nitrogen and sulfur heteroatoms may optionally be oxidized. The heterocyclic ring may be attached to a parent group or to a substituent at any heteroatom or carbon atom unless such attachment would violate valence requirements. Likewise, any of the carbon or nitrogen ring members may include a non-hydrogen substituent unless such substitution would violate valence requirements. Useful substituents include, without limitation, alkyl, alkenyl, alkynyl, haloalkyl, haloalkenyl, haloalkynyl, cycloalkyl, cycloalkenyl, alkoxy, cycloalkoxy, alkanoyl, cycloalkanoyl, cycloalkenoyl, alkoxycarbonyl, cycloalkoxycarbonyl, and halo, as defined above, and hydroxy, mercapto, nitro, amino, and alkylamino.

Examples of heterocycles include, without limitation, acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isobenzofuranyl, isochromanyl, isoindazolyl, isoindolinyl, isoindolyl, isoquinolinyl, isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolidinyl, pyrimidinyl, phenanthridinyl, phenanthrolinyl, phenazinyl, phenothiazinyl, phenoxathiinyl, phenoxazinyl, phthalazinyl, piperazinyl, piperidinyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, and xanthenyl.

"Heteroaryl" and "heteroarylene" refer, respectively, to monovalent and divalent heterocycles or heterocyclyl groups, as defined above, which are aromatic. Heteroaryl and heteroarylene groups represent a subset of aryl and arylene groups, respectively.

"Arylalkyl" and "heteroarylalkyl" refer, respectively, to aryl-alkyl and heteroaryl-alkyl, where aryl, heteroaryl, and alkyl are defined above. Examples include, without limitation, benzyl, fluorenylmethyl, imidazol-2-yl-methyl, and the like.

"Arylalkanoyl," "heteroarylalkanoyl," "arylalkenoyl," "heteroarylalkenoyl," "arylalkynoyl," and "heteroarylalkynoyl" refer, respectively, to aryl-alkanoyl, heteroaryl-alkanoyl, aryl-alkenoyl, heteroaryl-alkenoyl, aryl-alkynoyl, and heteroaryl-alkynoyl, where aryl, heteroaryl, alkanoyl, alkenoyl, and alkynoyl are defined above. Examples include, without limitation, benzoyl, benzylcarbonyl, fluorenoyl, fluorenylmethylcarbonyl, imidazol-2-oyl, imidazol-2-yl-methylcarbonyl, phenylethenecarbonyl, 1-phenylethenecarbonyl, 1-phenyl-propenecarbonyl, 2-phenyl-propenecarbonyl, 3-phenyl-propenecarbonyl, imidazol-2-yl-ethenecarbonyl, 1-(imidazol-2-yl)-ethenecarbonyl, 1-(imidazol-2-yl)-propenecarbonyl, 2-(imidazol-2-yl)-propenecarbonyl, 3-(imidazol-2-yl)-propenecarbonyl, phenylethynecarbonyl, phenylpropynecarbonyl, (imidazol-2-yl)-ethynecarbonyl, (imidazol-2-yl)-propynecarbonyl, and the like.

"Arylalkoxy" and "heteroarylalkoxy" refer, respectively, to aryl-alkoxy and heteroaryl-alkoxy, where aryl, heteroaryl, and alkoxy are defined above. Examples include, without limitation, benzyloxy, fluorenylmethyloxy, imidazol-2-yl-methyloxy, and the like.

"Aryloxy" and "heteroaryloxy" refer, respectively, to aryl-O— and heteroaryl-O—, where aryl and heteroaryl are defined above. Examples include, without limitation, phenoxy, imidazol-2-yloxy, and the like.

"Aryloxycarbonyl," "heteroaryloxycarbonyl," "arylalkoxycarbonyl," and "heteroarylalkoxycarbonyl" refer, respectively, to aryloxy-C(O)—, arylalkoxy-C(O)—, heteroarylalkoxy-C(O)—, where aryloxy, heteroaryloxy, arylalkoxy, and heteroarylalkoxy are defined above. Examples include, without limitation, phenoxycarbonyl, imidazol-2-yloxycarbonyl, benzyloxycarbonyl, fluorenylmethyloxycarbonyl, imidazol-2-yl-methyloxycarbonyl, and the like.

"alkylthio," "alkylthioalkyl," and "arylthio," refer, respectively, to —S-alkyl, alkyl substituted with alkylthio, and —S-aryl, where alkyl and aryl are defined above.

"arylsulfonyl" and "arylsulfinyl" refer, respectively, to aryl-S($O_2$)— and aryl-S(=O)—, where aryl is defined above.

II. Electrically Conductive Polymers

Photocrosslinkable electrically conductive polymers and a composition including such polymers are provided. As mentioned, the electrically conductive polymers according to the present disclosure have photoreactive groups. Under exposure of UV light, such photoreactive groups can be reacted together to form crosslinked structure. Photoreaction can be performed through photocrosslinking or photopolymerization. For example, photoreactive groups having chalcone, maleimide, cinnamate group and the like can be reacted together through photocycloaddition under UV light; photoreactive groups having vinyl group, epoxy group or vinyl ether group can be reacted together through radical photopolymerization or cationic polymerization under UV light and photoinitiator.

The photocrosslinkable electrically conductive polymer in the present disclosure can be prepared by copolymerization of a conventional electrically conductive polymer and an electrically conductive polymer having a photoreactive group.

In one embodiment, such an electrically conductive polymer is a copolymer including a repeating unit of formula 1 and a repeating unit of formula 2:

In the foregoing copolymer, A and B are independently at least one member selected from the group including phenylene, phenylene vinylene, pyrrolylene, pyrrolylene vinylene, thienylene, thienylene vinylene, fluorenylene, fluorenylene vinylene, furanylene, furanylene vinylene, phenothiazinylene, phenothiazinylene vinylene, phenazinylene, phenazinylene vinylene, phenoxazinylene and phenoxazinylene vinylene, which are unsubstituted or substituted with one or more substituents.

The substituents are independently selected from the group including hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylthio, alkylthioalkyl, arylthio, arylsulfonyl and arylsulfinyl. Or, the substituents together may form an alkylene or alkenylene chain completing a 3, 4, 5, 6, or 7-membered aromatic or alicyclic ring, and the ring may optionally include one or more divalent nitrogen, sulfur or oxygen atoms. The substituents may be further substituted or unsubstituted.

In the above formula, A and B are not limited to the exemplified monomers, and any monomer including electrically conductive polymers can be used. The monomer of Formula 1 and the monomer of Formula 2 may be easily dissolved in a solvent such as, but not limited to aqueous and organic solvents. Thus, if some of the monomers are not photo-crosslinked, such monomers may be washed out by the solvent.

In one embodiment the monomer B, which includes the photoreactive group, may be easily incorporated into the copolymer. The photoreactive group may be provided as a substituent of monomer B, or may be incorporated into the monomer and/or copolymer alone or in combination with the use of a linker molecule. The binding of the photoreactive group to the monomer B can be performed using any method in the art.

In one embodiment, the repeating unit of Formula 1 may be represented by Formula 3 or Formula 4; and the repeating unit of Formula 2 may be represented by Formula 5:

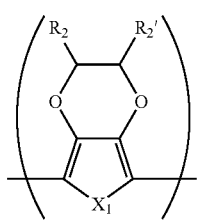

[Formula 3]

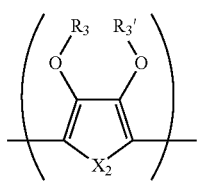

[Formula 4]

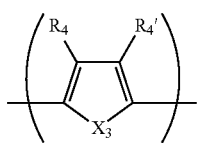

[Formula 5]

In the above formulas, $X_1$, $X_2$ and $X_3$ are independently NH, N, O, S or P; $R_2$, $R_2'$, $R_3$ and $R_3'$ are independently selected from the group including hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylhio, alkylthioalkyl, arylthio, arylsulfonyl and arylsulfinyl. Alternatively, $R_2$ and $R_2'$ or $R_3$ and $R_3'$ together may form an alkylene or alkenylene chain completing a 3, 4, 5, 6, or 7-membered aromatic or alicyclic ring, and the ring may optionally include one or more divalent nitrogen, sulfur or oxygen atoms. The substituents may be further substituted or unsubstituted.

$R_4$, and $R_4'$ are independently selected from the group including hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylhio, alkylthioalkyl, arylthio, arylsulfonyl, arylsulfinyl, Y, and L-Y, with a proviso that at least one of $R_4$ and $R_4'$ is Y or L-Y. Y is a photoreactive group. L is selected from the group including alkylene, alkylene oxide, alkenylene, alkenylene oxide and alkynylene, which is unsubstituted or substituted with alkyl or alkoxy; the ratio of the repeating unit of formula 3 or formula 4 and the repeating unit of formula 5 is 1:0.1 to 1:0.3; the copolymer has a degree of polymerization of 100 to 1,000. The copolymer may optionally be doped with one or more polymeric acids.

In another embodiment, $X_1$, $X_2$ and $X_3$ may be independently NH or S; $R_2$, $R_2'$, $R_3$ and $R_3'$ may be independently selected from the group including hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylhio, alkylthioalkyl, arylthio, arylsulfonyl and arylsulfinyl; or, $R_2$ and $R_2'$ or $R_3$ and $R_3'$ together may form an alkylene or alkenylene chain completing a 3, 4, 5, 6, or 7-membered aromatic or alicyclic ring, and the ring may optionally include one or more divalent nitrogen, sulfur or oxygen atoms. The substituents may be further substituted or unsubstituted. $R_4$, and $R_4'$ may be independently selected from the group including hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylamino alkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylhio, alkylthioalkyl, arylthio, arylsulfonyl, arylsulfinyl, Y, and L-Y, with a proviso that at least one of $R_4$ and $R_4'$ is Y or L-Y. L may be selected from the group including alkylene, alkylene oxide, alkenylene, alkenylene oxide and alkynylene, which is unsubstituted or substituted with alkyl, or alkoxy; the ratio of the repeating unit of formula 3 or formula 4 and the repeating unit of formula 5 is 1:0.1 to 1:0.5; the copolymer has a degree of polymerization of 100 to 1,000. The copolymer may optionally be doped with one or more polymeric acids.

In other embodiment, the repeating unit of Formula 3 may be represented by Formula 6, and the repeating unit of Formula 5 may be represented by Formula 7.

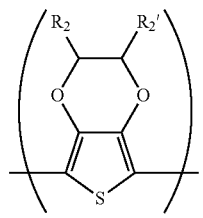

[Formula 6]

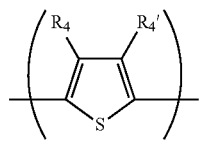

[Formula 7]

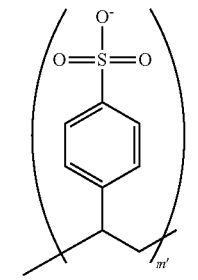

[Formula 8]

In Formulas 6-8, $R_2$, $R_2'$, $R_3$ and $R_3'$ are independently selected from the group including hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylamino alkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylhio, alkylthioalkyl, arylthio, arylsulfonyl and arylsulfinyl. Alternatively $R_2$ and $R_2'$ or $R_3$ and $R_3'$ together may form an alkylene or alkenylene chain completing a 3, 4, 5, 6, or 7-membered aromatic or alicyclic ring, and the ring may optionally include one or more divalent nitrogen, sulfur or oxygen atoms. The substituents may be further substituted or unsubstituted.

$R_4$, and $R_4'$ may be independently selected from the group including hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylhio, alkylthioalkyl, arylthio, arylsulfonyl, arylsulfinyl, Y, and L-Y, with a proviso that at least one of $R_4$ and $R_4'$ is Y or L-Y. Y is a photoreactive group. L is selected from the group including alkylene, alkylene oxide, alkenylene, alkenylene oxide and alkynylene, which is unsubstituted or substituted with alkyl or alkoxy; the ratio of the repeating unit of formula 6 and the repeating unit of formula 7 is 1:0.1 to 1:0.3; the copolymer has a degree of polymerization of 100 to 1,000. The copolymer may optionally be doped with a polymeric acid of formula 8 and m' may be 100 to 1000.

In any of the above formulas, L may be selected from the group including $C_6$-$C_{12}$ alkylene or $C_6$-$C_{12}$ alkylene oxide, which may be unsubstituted or substituted with $C_1$-$C_{12}$ alkyl or $C_1$-$C_{12}$ alkoxy.

In any of the above formulas, conductive polymer may be doped with the polymeric acids in the form of an ionic bond. The conductive polymer may be doped with any polymeric acids so long as the polymeric acids do not prohibit solubility of the conductive polymer in the solvent used to manufacture the desired films or layers. The polymeric acids can be used for providing charges on the conductive polymer to elevate electrical conductivity. Such polymeric acids includes poly(styrenesulfonate) and the like.

In one embodiment, the repeating unit of Formula 6 may be 3,4-ethylenedioxythiophene and the copolymer may be doped with styrenesulfonate. Poly(3,4-ethylenedioxythiophene)poly(styrenesulfonate) [PEDOT:PSS] can have very high electrical conductivity. In the present disclosure, PEDOT:PSS can be copolymered with a conductive polymer having a photoreactive group.

Also, the Y may be selected from the group including a cinnamoyl group, a chalcone group, a coumarin group, a maleimide group, an anthracenic group, a pyrimidine group, a vinyl group, a epoxy group, a vinyl ether group, an alkyne group, a benzothiophene dioxide group, dibenz[b,f]azepine group, a stilbazole group, a stilbene group, a thiadiazole group, and a thymine group, which is unsubstituted or substituted with at least one substituent having at least one ionic moiety. When the Y is substituted with at least one substituent having at least one ionic moiety, the ionic moiety can allow the electrically conductive polymer to sustain more solubility in aqueous solvent. For example, cationic ionic moiety such as ammonium pyridinium, quinolinium can be used as the ionic moiety. The Y can be selected depending on hardening conditions. For example, a cinnamoyl group can be crosslinked under 254 nm UV light. Chalcone can be cured under 365 nm light at room temperature and ambient conditions. Also, coumarine, maleimide and anthracene can be crosslinked under 365 nm, 254 nm, and 313 nm light, respectively. Therefore, a skilled artisan can consider the hardening condition of a conductive layer and select proper photoreactive group to be used in the present copolymer composition.

The photocrosslinkable electrically conductive polymer in the present disclosure can be prepared by copolymerization of a conventional electrically conductive polymer and an electrically conductive polymer having a photoreactive group, for example, through an oxidative coupling reaction, or reaction performing a similar function. Usually, when the photoreactive monomers are incorporated in the copolymer in content of about 10% to 30%, they may be sufficient to induce a photocrosslinking reaction. In one embodiment, in the above formulas, the repeating unit of conventional electrically conductive polymer and the repeating unit of an electrically conductive polymer having a photoreactive group may be 1:0.1 to 1:0.3. Once this copolymer is prepared, the solubility or swelling behavior of the copolymer can be checked after photocrosslinking to adjust for the proper ratio of the repeating units. The ratio of the repeating units may be adjusted to optimize electrical conductivity as well as inducing a photocrosslinking reaction.

In the present disclosure, the photoreactive group takes a role to induce a photocrosslinking reaction between the photoreactive groups in the copolymers. The kinds of photoreactive groups are not limited. Any conventional photoreactive group can be incorporated into the copolymer.

In one embodiment, Y may be selected from the group including a cinnamoyl group, a chalcone group, a coumarin group, a maleimide group, an anthracenic group and a pyrimidine group, which is unsubstituted or substituted with at least one substituent having at least one ionic moiety, but is not limited thereto.

A composition comprising a copolymer according to the present disclosure is also provided. To fabricate a conductive film or layer using a conductive copolymer of the present disclosure, the conductive copolymer can be dispersed in a solvent to prepare a composition. Any solvent can be used for the conductive copolymer composition so long as it can substantially dissolve the conductive copolymer. Examples of solvents useful in the present disclosure include without limitation water, alcohol, or mixtures thereof.

The copolymers can be photocrosslinked with each other under UV light, for example, through a 2+2 cycloaddition reaction, even though there are no cross-linking agents or photoinitiators. However, in case of the photoreactive groups are reacted through photopolymerization, the composition can further comprise a cross-linking agent, a photoinitiator and the like.

The crosslinking agent may include a physical crosslinking agent and/or a chemical crosslinking agent. The physical crosslinking agent may refer to a low or high molecular weight compound having at least one hydroxyl (OH) group, which functions to physically crosslink polymer chains without any chemical bond. Examples of the physical crosslinking agents can include without limitation low molecular weight compounds such as glycerol and butanol, and high molecular weight compounds such as polyvinyl alcohol and polyethyleneglycol. In addition, other specific examples of physical crosslinking agents can include without limitation polyethylenimine and polyvinylpyrolidone. The content of the physical crosslinking agent in the composition can be about 0.001 to about 5 parts by weight, for example, or about 0.1 to about 3 parts by weight, based on 100 parts by weight of the conductive copolymer composition. When the physical crosslinking agent is used in an amount within the range as defined above, it can efficiently crosslink and can impart the desired film morphology to the conductive copolymer thin film.

The chemical crosslinking agent may refer to a chemical material which can chemically crosslink compounds, induce in-situ polymerization, and/or form an interpenetrating polymer network (IPN). Example chemical crosslinking agents can include silanes such as tetraethyloxysilane (TEOS). In addition, specific examples of chemical crosslinking agents can include without limitation polyaziridines, melamines and epoxies. The content of the chemical crosslinking agent in the composition can be about 0.001 to about 5 parts by weight, for example, or about 0.1 to about 3 parts by weight, based on 100 parts by weight of the conductive copolymer composition. When the chemical crosslinking agent is used in an amount within the range provided above, it can efficiently crosslink, and may not significantly influence the conductive polymer, and thus can sufficiently maintain the conductivity of a conductive copolymer thin film.

The composition may further include other water soluble or dispersible materials. Depending on the final application of the copolymer of the present disclosure, examples of types of additional water soluble or dispersible materials which can be added include, but are not limited to, polymers, dyes, coating aids, carbon nanomaterials, such as carbon nanotubes, metal nanowires and nanoparticles, organic and inorganic conductive inks and pastes, charge transport materials, piezoelectric, pyroelectric, or ferroelectric oxide nano-particles or polymers, photoconductive oxide nanoparticles or polymers, dispersing agents, and combinations thereof. The materials can be simple molecules or polymers. Examples of other suitable water soluble or dispersible polymers include, but are not limited to, polyacrylamide, polyvinylalcohol, poly(2-vinylpyridine), poly(vinylacetate), poly(vinylmethylether), poly(vinylpyrrolidone), poly(vinylbutyral), poly(styrenesulfonic acid), and conductive polymers such as polythiophenes, polyanilines, polyamines, polypyrroles, polyacetylenes, and combinations thereof.

III. Methods for Manufacturing Conductive Polymers and Devices Including the Conductive Polymers An electrically conductive layer or film manufactured from the above composition is also provided. As mentioned above, the electrically conductive copolymer compositions described herein may be used to make an electrically conductive layer or film.

The process for preparing a conductive layer or film includes applying the electrically conductive copolymer composition on a substrate and exposing the substrate to UV light, thereby inducing a photocrosslinking reaction of the composition.

The term "layer" or "film" refers to a coating covering a desired area and may be used interchangeably. The area can be as large as an entire device or as small as a specific functional area such as the actual visual display, or as small as a single sub-pixel. Films or layers can be formed by any conventional deposition technique, including vapor deposition and liquid deposition. In one embodiment, the electrically conductive polymers are soluble in a solvent and the solubility allows for the use of liquid deposition techniques. In some embodiments of the present disclosure, liquid deposition provides a convenient process to enable fabrication of a large patterned layer or film. Typical liquid deposition techniques include, but are not limited to, continuous deposition techniques such as spin coating, gravure coating, curtain coating, dip coating, slot-die coating, spray coating, continuous nozzle coating, and doctor blade coating; and discontinuous deposition techniques such as ink-jet printing, gravure printing, and screen printing.

In the process for preparing the conductive layer or film, the UV light may have a wavelength of 150 nm to 400 nm. The wavelength of UV light can be suitably varied according to the photoreactive groups of the copolymer, or cross-linking agent or photoinitiator, if any.

The conductive layer or film may be patterned. Although any well known technique can be used for patterning, the copolymers of the present disclosure have a photocrosslinkable property, and so a technique using a photomask can be used to form a pattern. A photomask is an opaque layer with holes or transparencies that allow light to shine through in a defined pattern. Any type of photomasks can be used in the process of manufacturing the electrically conductive copolymers described herein so long as the photomask can block portions of the light used to photocrosslink the copolymers, and do so in a defined pattern. The portions of the photomask that allow transmission define the patterned layer where photocrosslinked electrically conductive copolymer will remain and the opaque portions of the photomask define the portions of the film or layer where the electrically conductive copolymer will be absent. The pattern on the conductive layer or film may vary as desired by providing a photomask with opaque and translucent patents that define the desired pattern. In one embodiment, the photomask can be a lithographic photomask. The lithographic photomask may be formed using any technique used in the semiconductor art for making lithographic photomasks. The size dimensions of the pattern formed may depend on the size of the features in the photomask that provide the desired pattern. In one embodiment, the size of the features may be relatively large such as greater than 1 mm. In many embodiments, the width or closest spacing between features of the pattern in the film or layer can be 0.1 µm to 10 mm, more specifically 0.5 µm to 1 mm, or even more specifically 1 µm to 1,000 µm In one embodiment, to form a patterned conductive layer, the process may include depositing a layer of soluble copolymer on a substrate and exposing the substrate to UV light through a photomask. Illuminating the substrate causes the exposed regions of the copolymer to photocrosslink and harden. Hardened copolymer (i.e., photocrosslinked copolymer) precipitates out of the solvent to form a patterned electrically conductive layer or film. The substrate is washed with a solvent that dissolves unhardened (i.e., uncrosslinked) copolymer.

In one embodiment, the solvent used to remove unhardened material may be a polar solvent such as, but not limited to aqueous solvents. The solvent may be without limitation water, alcohol, or a mixture of these.

The methods of manufacturing electrically conductive layers and films using the copolymers describe above also includes performing two or more iterations of depositing an unhardened copolymer layer on a substrate, applying a photomask to the unhardened layer, hardening a portion of the unhardened layer according the photomask pattern, and washing the unhardened remainder. The iterative methods can be used to provide multiple layers having desired patterns that interconnect in ways not possible with a single step process.

While a photomask may be helpful in achieving accurate dimensions in a patterned layer or film incorporating the copolymers described above, the use of a photomask is not necessary in all embodiments.

The methods of making an electrically conductive layer or film using the above described copolymer materials can be carried out alone or in combination with any other techniques for making electrical devices, including, but not limited to chemical vapor deposition and traditional lithographic techniques.

The conductive copolymer of the present disclosure can be used in an electronic device as an electrode or an electrode buffer layer to increase quantum efficiency. In an organic transistor, the conductive polymer can be used as an electrode material for a gate, a source-drain electrode, and the like. Further, in an electronic device, the conductive polymer compositions can be deposited to form buffer layers. The term "buffer layer" as used herein is intended to mean an electrically conductive or semiconductive layer which can be used between an anode and an active organic material. A buffer layer is believed to accomplish one or more functions in an organic electronic device, including, but not limited to, planarization of the underlying layer, hole transport, hole injection, scavenging of impurities, such as oxygen and metal ions, among other aspects to facilitate or to improve the performance of an organic electronic device.

There are also provided articles including at least one electrically conductive layer or film formed from the above conductive polymer compositions. For example, organic electronic devices that may benefit from having one or more layers made from the copolymer composition include, but are not limited to, (1) devices that convert electrical energy into radiation (e.g., a light-emitting diode, light emitting diode displays, liquid crystal displays, electronic paper, touchscreens, or diode lasers), (2) devices that detect signals through electronics processes (e.g., photodetectors, photoconductive cells, photoresistors, photoswitches, phototransistors, phototubes, IR detectors), (3) devices that convert radiation into electrical energy, (e.g., a photovoltaic device or solar cell), and (4) devices that include one or more electronic components that include one or more organic semi-conductor layers (e.g., a transistor or diode). Other uses for the compositions include coating materials for memory storage devices, antistatic films, biosensors, electrochromic devices, solid electrolyte capacitors, energy storage devices such as a rechargeable battery, electromagnetic wave shielding films, window de-icers, heat reflectors, and architectural materials.

FIGS. 1-4 illustrate an example of a process that can be carried out using any of the above described copolymers to make an electrical device 110. FIG. 1 illustrates a substrate 112 that can be used in the process described herein. Substrate 112 can be any material, including a semiconductor material such as, but not limited to a semiconductor substrate. While substrate 112 has been illustrated as a planar surface, those skilled in the art will recognize that substrate 112 can have any number of features, including any of the features or sub-features of the electronic components described above (e.g., electrodes, transistors, and/or components or sub-components of an LED display).

Figure 2:
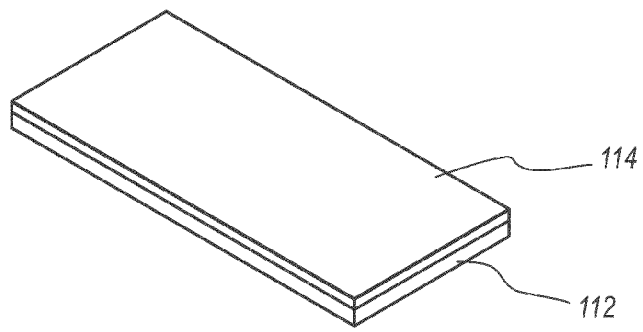
FIG. 2 is a perspective view of a layer of copolymer formed on the substrate of FIG. 1 according to an illustrative embodiment.

In a second step illustrated in FIG. 2, a composition including any of the electrically conductive copolymers described above is deposited on substrate 112 to form an unhardened copolymer layer 114. unhardened copolymer layer can be deposited using any of the techniques described above such as, but not limited to, spin coating.

Figure 3:
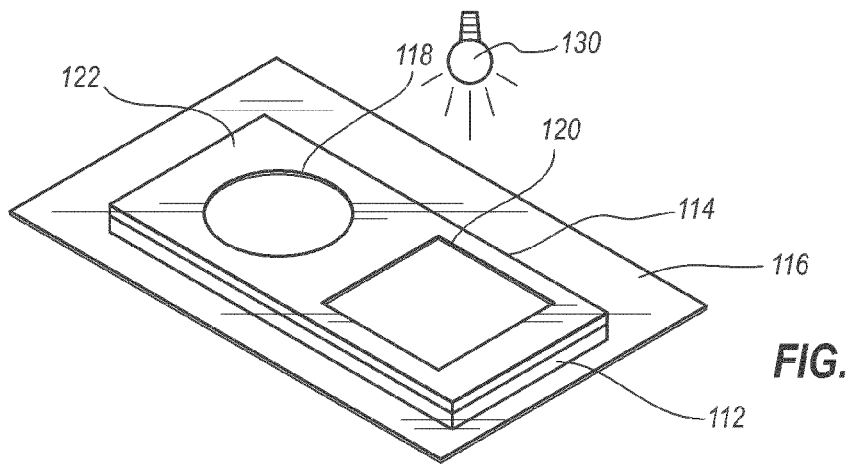
FIG. 3 is a perspective view of a photomask positioned over the copolymer layer of FIG. 2 according to an illustrative embodiment.

In a third step illustrated in FIG. 3, a mask 116 is positioned above layer 114. Mask 116 includes optically translucent features 118 and 120 and an optically opaque region 122. The optically translucent features 118 and 120 and the optically opaque region 122 are illustrated as simplistic features. However, those skilled in the art will recognize the various desired patterns that may be used with mask 116 to make one or more of the features or sub-features of the electrical components described above. In one embodiment, the dimensions of features 118 and 120 are on the order of microns or sub microns (i.e., the smallest patterned dimensions in features 118 and 120 are micron sized or sub-micron sized).

After masking layer 114, the substrate 112 is illuminated with a light source 130 capable of causing crosslinking of the electrically conductive copolymers in layer 114. Light source 130 is selected to have a wavelength of light that is blocked by portion 122 of mask 116, while being transmitted through features 118 and 120 and causing crosslinking in layer 114. An example of a suitable wavelength of light that may be used to cure the copolymer of layer 114 includes, but is not limited to UV light. The optically translucent features 118 and 120 allow a desired portion of layer 114 to be crosslinked and harden while the opaque region 122 blocks a desired portion of layer 114 from hardening. The selective crosslinking of the copolymer in layer 114 results in a desired hardened pattern.

Figure 4:
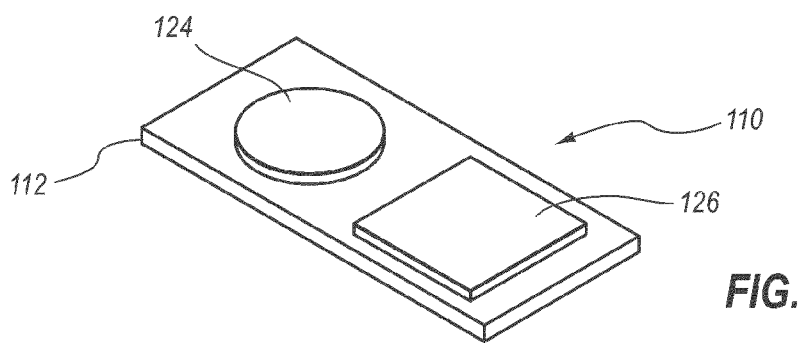
FIG. 4 is a perspective view of an article manufactured from the substrate and copolymer layers of FIG. 2 according to an illustrative embodiment.

In another step illustrated in FIG. 4, mask 116 is removed and a solvent is applied to remove the unhardened portion of layer 114 to yield an article having desired conductive features 124 and 126. While desired conductive features 124 and 126 are shown as simplistic circular and square disks, respectively, those skilled in the art will recognize that the foregoing process may be used to manufacture any desired intricate feature that can be patterned in a photomask. In one embodiment, the features 118 and 120 may be features that are typically made from ITO. In one embodiment, features 118 or 120 may be an electrode.

In yet another embodiment, the process for manufacturing an article as described herein may be performed in iterations using article 110 as the substrate. Subsequent iterations of the process are carried out similar to the process for making article 110 except that article 110 is used as the substrate. The devices can be made to have any number of layers and/or any number of desired features.

The process for manufacturing article 110 may be used to manufacture articles that are relatively large in size. In one embodiment, the article 110 may include an array of pixels on substrate 112 and substrate 112 may have a width and/or height in a range from 50 mm to 2000 mm, more specifically 200 mm to 1500 mm and more specifically 300 mm to 1000 mm. In one embodiment, article 110 may be incorporated into an LED display.

As an example, an organic electroluminescent device employing the composition of a conducting copolymer will now be described. The present disclosure will be further made clear from the following example described in detail. However, it is to be understood that the present disclosure is not limited thereto, but may be otherwise variously embodied and practiced.

Those of ordinary skill will appreciate that, for this and other processes and methods disclosed herein, the functions performed in the processes and methods may be implemented in differing order. Furthermore, the outlined steps and operations are provided only as examples, and some of the steps and operations may be optional, combined into fewer steps and operations, or expanded to include additional steps and operations without detracting from the essence of the present disclosure.

IV. Example

As a repeating unit having photoreactive group, thiophene having cinnamoyl group substituted with ionic group (ammonium pyridinium) is prepared. Then, 3,4-ethylenedioxythiophene and the thiophene having cinnamoyl group are copolymerized in chloroform solvent using $FeCl_3$ through an oxidative coupling reaction. The resulting copolymers are dissolved in water to prepare a copolymer composition.

The copolymer composition is used as an electrode of a flexible display device. The flexible display device generally comprises an anode layer, a hole injection layer, an electroluminescent layer, a cathode layer, and a flexible organic film. A transparent plastic substrate having good manageability and waterproofness may used as the flexible organic film like polycarbonate, polyethylene terephthalate (PET) or polyethylene naphthalate (PEN).

The flexible display device is manufactured using a typical method of preparing display devices, which are not particularly limited. First, an anode layer or cathode layer as a first electrode is formed on the plastic substrate. The first electrode layer is formed by spin coating the above copolymer composition on the plastic substrate, then a patterned mask is positioned on the substrate, and the substrate is exposed to about 254 nm of UV light to induce photocrosslinking between cinnamoyl groups in the copolymer. Then, the substrate is washed with water to remove the unhardened part of the first electrode layer, thereby obtaining a patterned electrode.

The hole injection layer is formed on the first electrode. The formation of the hole injection layer reduces contact resistance of the first electrode and the electroluminescent layer and improves the electron transport ability of the first electrode to the electroluminescent layer, thereby improving the driving voltage and the lifetime of the electroluminescent device.

The hole injection layer (also referred to as the buffer layer) is formed by spin coating on the first electrode and drying it. Typical conducting polymers employed as buffer layers include polyaniline and polydioxythiophenes such as poly(3, 4-ethylenedioxythiophene) (PEDOT). These materials can be prepared by polymerizing aniline or dioxythiophene monomers in aqueous solution in the presence of a water soluble polymeric acid, such as poly(styrenesulfonic acid) (PSSA), or poly(2-acrylamido-2-methyl-1-propanesulfonic acid) ("PAAMPSA"), as described in, for example, U.S. Pat. No. 5,300,575 and published in PCT application WO 02/065484. A well known PEDOT/PSS material is Baytron®-P, commercially available from H. C. Starck, GmbH (Leverkusen, Germany).

The electroluminescent layer is formed on the hole injection layer. A material for the electroluminescent layer is not particularly limited, but examples thereof include oxadiazole dimer dyes (Bis-DAPDXP), spiro compounds (Spiro-DPVBi, Spiro-6P), triarylamine compounds, bis(styryl) amine (DPVBi, DSA), Flrpic, CzTT, Anthracene, TPB, PPCP, DST, TPA, OXD-4, BBOT, AZM-Zn, etc. which are blue materials, Coumarin 6, C545T, Quinacridone, Ir(ppy)3, etc., which are green materials, and DCM1, DCM2, Eu (thenoyltrifluoroacetone)3(Eu(TTA)3), butyl-6-(1,1,7,7-tetramethyljulolidyl-9-enyl)-4H-pyran (DCJTB), etc., which are red materials. In addition, examples of the polymer light-emitting material include polymers such as phenylene, phenylene vinylene, thiophene, fluorene, and spiro-fluorene-based polymers and aromatic compounds containing nitrogen, but are not limited thereto.

The electroluminescent layer forming composition further includes a dopant, if necessary. The amount of the dopant varies depending on the material for the electroluminescent layer, but may be generally 30-80 parts by weight based on 100 parts by weight of a material for the electroluminescent layer (total weight of the host and the dopant). When the amount of the dopant is not within this range, the luminous characteristics of an electroluminescent display device are reduced. Examples of the dopant include arylamine, perylenes, pyrroles, hydrazones, carbazoles, stilbenes, starbursts, oxadiazoles and derivatives thereof.

The hole transport layer may be optionally formed between the hole injection layer and the electroluminescent layer.

The material for the hole transport layer is not particularly limited, but may be selected from a compound having a carbazole group and/or an arylamine group, which transport electrons, a phthalocyanine-based compound, and a triphenylene derivative. More particularly, the electron transport layer (HTL) may be composed of at least one material selected from the group consisting of 1,3,5-tricarbazolylbenzene, 4,4'-biscarbazolylbiphenyl, polyvinylcarbazole, m-biscarbazolylbenzene, 4,4'-biscarbazolyl-2,2'-dimethylbiphenyl, 4,4',4"-tri(N-carbazolyl)triphenylamine, 1,3,5-tri(2-carbazolylphenyl)benzene, 1,3,5-tris(2-carbazolyl-5-methoxyphenyl)benzene, bis(4-carbazolylphenyl)silane, N,N'-bis(3-methylphenyl)-N,N'-diphenyl-[1,1-biphenyl]-4,4'-diamine (TPD), N,N'-di(naphthalene-1-yl)-N,N'-diphenyl benzidine (α-NPD), N,N'-diphenyl-N,N'-bis(1-naphthyl)-(1,1'-biphenyl)-4,4'-diamine (NPB), IDE320 (Idemitsu Kosan Co., LTD.), poly(9,9-dioctylfluorene-co-N-(4-butylphenyl) diphenylamine (TFB), and poly(9,9-dioctylfluorene-co-bis-N,N-phenyl-1,4-phenylenediamine) (PFB), but are not limited thereto. The hole blocking layer may be composed of phenanthrolines (e.g., BCP available from UDC), imidazoles, triazoles, oxadiazoles (e.g., PBD), aluminium complex (available from UDC), or BAlq and the like.

Then, the second electrode is formed on the resultant and sealed to complete an organic electroluminescent device. The material for the second electrode is not particularly limited, but may be a metal having a low work function, i.e., Li, Cs, Ba, Ca, Ca/Al, LiF/Ca, LiF/Al, BaF$_2$/Ca, Mg, Ag, Al, or an alloy thereof, or a multilayer thereof.

The organic electroluminescent device of the present disclosure does not require a particular apparatus or method for manufacturing, it and can be manufactured using a conventional manufacturing method.

The present disclosure is not to be limited in terms of the particular examples described in this disclosure. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A copolymer comprising repeating units of Formula 4, Formula 6, Formula 7 and Formula 8:

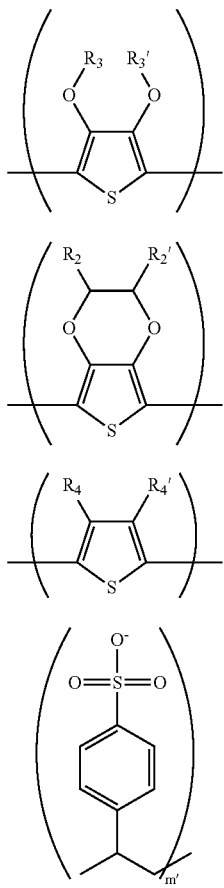

[Formula 4]

[Formula 6]

[Formula 7]

[Formula 8]

wherein $R_2$, $R_2'$, $R_3$ and $R_3'$ are independently selected from the group consisting of hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylthio, alkylthioalkyl, arylthio, arylsulfonyl and arylsulfinyl; or, $R_2$ and $R_2'$ or $R_3$ and $R_3'$ together form an alkylene or alkenylene chain completing a 3, 4, 5, 6, or 7-membered aromatic or alicyclic ring, and the ring optionally includes one or more divalent nitrogen, sulfur or oxygen atoms; and the substituents are substituted or unsubstituted;

$R_4$, and $R_4'$ are independently selected from the group consisting of hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylthio, alkylthioalkyl, arylthio, arylsulfonyl, arylsulfinyl, Y and L-Y, with a proviso that at least one of $R_4$ and $R_4'$ is Y or L-Y;

$X_2$ is NH, N, O, S or P;

Y is a photoreactive group;

L is selected from the group consisting of alkylene, alkylene oxide, alkenylene, alkenylene oxide and alkynylene, which is unsubstituted or substituted with alkyl, alkoxy or a combination thereof;

the ratio of the repeating unit of Formula 4 or Formula 6 and the repeating unit of Formula 7 is 1:0.1 to 1:0.5;

the copolymer has a degree of polymerization of 100 to 1,000;

the copolymer is doped with a polymeric acid of formula 8; and m' is 100 to 1000.

2. The copolymer of claim 1, wherein L is selected from the group consisting of $C_6$-$C_{12}$ alkylene or $C_6$-$C_{12}$ alkylene oxide, which is unsubstituted or substituted with $C_1$-$C_{12}$ alkyl, $C_1$-$C_{12}$ alkoxy or a combination thereof.

3. The copolymer of claim 2, wherein the repeating unit of formula 6 is 3,4-ethylenedioxythiophene and the copolymer is doped with poly(styrenesulfonate).

4. The copolymer of claim 1, wherein Y is selected from the group consisting of a cinnamoyl group, a chalcone group, a coumarin group, a maleimide group, an anthracenic group and a pyrimidine group, which is unsubstituted or substituted with at least one substituent having at least one ionic moiety.

* * * * *

UNITED STATES PATENT AND TRADEMARK OFFICE
CERTIFICATE OF CORRECTION

PATENT NO. : 8,536,300 B2  
APPLICATION NO. : 12/650058  
DATED : September 17, 2013  
INVENTOR(S) : Choi It is certified that error appears in the above-identified patent and that said Letters Patent is hereby corrected as shown below:

On the Title Page, Item (56), under "OTHER PUBLICATIONS", in Column 2, Line 1, delete "al" and insert -- al. --, therefor.

On the Title Page, Item (56), under "OTHER PUBLICATIONS", in Column 2, Line 2, delete "Side-Chane" and insert -- Side-Chain --, therefor.

On the Title Page, Item (56), under "OTHER PUBLICATIONS", in Column 2, Line 4, delete "al" and insert -- al. --, therefor.

On the Title Page, Item (56), under "OTHER PUBLICATIONS", in Column 2, Line 7, delete "al" and insert -- al. --, therefor.

On the Title Page, Item (56), under "OTHER PUBLICATIONS", in Column 2, Line 12, delete "al" and insert -- al. --, therefor.

In the Specification:

In Column 2, Line 15, delete "alkylhio," and insert -- alkylthio, --, therefor.

In Column 2, Line 51, delete "copolymer;" and insert -- copolymer. --, therefor.

In Column 5, Line 5, delete "C3-7" and insert -- $C_{3-7}$ --, therefor.

In Column 5, Line 31, delete "C3-7" and insert -- $C_{3-7}$ --, therefor.

In Column 6, Line 13, delete "isooxazolyl," and insert -- isoxazolyl, --, therefor.

In Column 8, Line 56, delete "alkylhio," and insert -- alkylthio, --, therefor.

Signed and Sealed this  
Fifth Day of August, 2014

Michelle K. Lee  
*Deputy Director of the United States Patent and Trademark Office*

CERTIFICATE OF CORRECTION (continued)
U.S. Pat. No. 8,536,300 B2

In Column 8, Line 63, insert -- In Formula 2, $R_1$ is Y or L-Y, wherein Y is a photoreactive group and L is a linker; the ratio of the repeating unit of formula 1 and the repeating unit of formula 2 is 1:0.1 to 1:0.3; the copolymer has a degree of polymerization of 100 to 1,000. The copolymer may be either doped or undoped with at least one polymeric acid. --, as a new paragraph.

In Column 9, Lines 58-59, delete "alkylhio," and insert -- alkylthio, --, therefor.

In Column 10, Line 15, delete "alkylhio," and insert -- alkylthio, --, therefor.

In Column 10, Lines 42-43, delete "alkylhio," and insert -- alkylthio, --, therefor.

In Column 10, Line 65, delete "alkylhio," and insert -- alkylthio, --, therefor.

In Column 11, Lines 57-58, delete "alkylhio," and insert -- alkylthio, --, therefor.

In Column 12, Line 15, delete "alkylhio," and insert -- alkylthio, --, therefor.

In Column 13, Line 57, delete "polyvinylpyrolidone." and insert -- polyvinylpyrrolidone --, therefor.

In Column 16, Line 66, delete "masking layer 114," and insert -- masking layer 116, --, therefor.

In Column 18, Line 40, delete "(Bis-DAPDXP)," and insert -- (Bis-DAPOXP), --, therefor.

In the Claims:

In Column 22, Line 5, in Claim 1, delete "alkylhio," and insert -- alkylthio, --, therefor.

In Column 22, Line 29, in Claim 1, delete "alkylhio," and insert -- alkylthio, --, therefor.